(12) United States Patent
Pozzoni

(10) Patent No.: US 8,315,300 B2
(45) Date of Patent: Nov. 20, 2012

(54) ENHANCEMENT OF TRANSITION REGION EQUALIZATION IN A DECISION FEEDBACK EQUALIZER

(75) Inventor: Massimo Pozzoni, Pavia (IT)

(73) Assignee: STMicroelectronics S.R.L., Agrater Brianza (MB) (IT)

(*) Notice: Subject to any disclaimer, the term of this patent is extended or adjusted under 35 U.S.C. 154(b) by 465 days.

(21) Appl. No.: 12/581,554

(22) Filed: Oct. 19, 2009

(65) Prior Publication Data

US 2010/0104000 A1 Apr. 29, 2010

(30) Foreign Application Priority Data

Oct. 24, 2008 (IT) .............................. VA2008A0053

(51) Int. Cl.
*H04L 27/01* (2006.01)
(52) U.S. Cl. ....................................................... 375/233
(58) Field of Classification Search .......... 375/232–233, 375/350; 708/322–323
See application file for complete search history.

(56) References Cited

U.S. PATENT DOCUMENTS

| | | | | |
|---|---|---|---|---|
| 6,047,026 A * | 4/2000 | Chao et al. | .................... | 375/233 |
| 7,394,849 B2 * | 7/2008 | Ibragimov et al. | ............ | 375/233 |
| 7,636,408 B2 * | 12/2009 | Bau et al. | ....................... | 375/354 |
| 8,005,134 B2 * | 8/2011 | Yamane et al. | ................ | 375/232 |
| 2004/0258145 A1 | 12/2004 | Popescu et al. | ................ | 375/232 |
| 2004/0258183 A1 * | 12/2004 | Popescu et al. | ................ | 375/350 |
| 2005/0280568 A1 * | 12/2005 | Rowland et al. | ............... | 341/155 |
| 2006/0188043 A1 | 8/2006 | Zerbe et al. | ..................... | 375/346 |
| 2010/0103998 A1 * | 4/2010 | Erba et al. | ...................... | 375/233 |

FOREIGN PATENT DOCUMENTS

EP 1545043 A2 9/2004
EP 1545043 A3 9/2004

OTHER PUBLICATIONS

Sonntag et al. *A Digital Clock and Data Recovery Architecture for Multi-Gigabit/s Binary Links*: IEEE 2005 Custom Integrated Circuits Conference; Sep. 18, 2005; 16-2-1; pp. 537544.
Bien et al. *Digitally Controlled 10 Gb/s Adjustable Delay Line for Adaptive Filter Design in Standard CMOS Technology*: IEEE 2007 International Symposium on Circuits and Systems; May 1, 2007; pp. 197-200.

* cited by examiner

*Primary Examiner* — Khanh C Tran
(74) *Attorney, Agent, or Firm* — Allen, Dyer, Doppelt, Milbrath & Gilchrist, P.A.

(57) ABSTRACT

A decision feedback equalizer includes an input path for receiving a bitstream with inter-symbol interference, and a feedback signal path is coupled to the input path for correcting a sampled value of an incoming bit of the bitstream based on inter-symbol interference of a preceding bit. The feedback signal path includes a controllable delay circuit for receiving the preceding bit. A feedback path controller is coupled to the controllable delay circuit to regulate a delay introduced to the preceding bit. The delay is a function of an accumulated value of data of early-late events of a sampling instant of the bitstream for different data pulse patterns.

25 Claims, 17 Drawing Sheets

ENHANCEMENT OF TRANSITION REGION EQUALIZATION IN A DECISION FEEDBACK EQUALIZER

FIELD OF THE INVENTION

The present invention relates to the equalization of high speed signals to compensate degradation due to a limited bandwidth of the transmission channel and other limitations. In particular, the present invention relates to an add-on improvement of an equalization technique known as decision feedback equalization (DFE).

BACKGROUND OF THE INVENTION

In serial transmission systems operating at high bit rates over standard pc-boards or coaxial cables, data receivers may receive significantly distorted signals. Inter-symbol interference (ISI) generated by a limited bandwidth, reflections due to impedance mismatches and other limitations of the transmission media increase the probability of an erroneous recognition of a received bit. For these reasons, it becomes necessary to place, at the receiver input, a circuit to recover the signal before sending it to a re-sampler. Otherwise, the signal arriving at the sampler could be affected by amplitude reduction (vertical eye closure) and/or by timing jitter (horizontal eye closure), as depicted in FIG. 1.

Inside the receiver, a clock and data recovery block (CDR) has the function to reconstruct the clock timing for correctly re-sampling the received data ideally at the middle of the "eye." However, horizontal (timing) and vertical (amplitude) degradation of the eye negatively affect the CDR capability of correctly recovering the incoming signal (bit). In fact, as a consequence of timing jitter and amplitude reduction suffered by the transmitted data pulse signal, the CDR is required to have an adequately enhanced precision in positioning the sampling clock at the center of the eye and while being sensitive to small amplitude signals.

A typical serial transmission chain is shown in FIG. 2. A linear equalizer is usually placed at the input of the receiver implementing a frequency transfer function to match the reverse of the transfer function of the transmission channel H(s). If such a match is achieved, the aperture of the eye is improved, both horizontally and vertically.

Upon increasing the operating frequency, the capability of such a linear equalizer acting as a high pass filter matching the reverse of the transfer function of the transmission channel may be inadequate to provide sufficient compensation of the channel frequency losses.

As a result, a different technique of equalization, known as decision feedback equalization (DFE), is implemented between the linear equalizer and the re-sampler. DFE may even completely substitute traditional linear equalization.

FIG. 3a shows an example of the degradation of a unitary pulse (a pulse whose amplitude is 1 volt and has a duration that is a 1 bit unit interval (UI)) caused by a limited bandwidth and other limitations of the transmission channel. The resulting pulse has a lower peak value and a longer duration. Considering the transmission channel as a linear system, a generic received signal can be seen as the superposition of individual pulses of positive or negative polarity, as shown in FIG. 3a, based on positive or negative bits being transmitted. An example superposition of pulse amplitudes at any sampling instant for a train of adjacent data pulses of a same amplitude and sign as received is shown in FIG. 3b.

If we assume the receiver to be correctly sampling each bit of the received data pulse signal at its pulse peak ($C_0$ or cursor value), postcursor amplitude values of pulse tails of the bits preceding the bit subject to sampling, as well as precursor amplitude values of successive bits as received, sum to the cursor value as an ISI contribution to the sampled amplitude of the incoming signal.

The known DFE technique is based on the principle that, because the previous data bits are known, their contributory effects in producing ISI on the incoming data bit may be determined and deleted by subtracting a quantity equal to the ISI that is produced on an incoming data bit.

A DFE uses sampled values ($b_n$) and respective sampling errors ($e_n$) to estimate channel-dependent coefficients ($c_i$) that multiply with the corresponding previous bits, and subtracts the results from the incoming data bit. An exemplary implementation of a DFE using four coefficients is shown in FIG. 4.

The value $b_n$ is provided by a comparator COMP1 that checks whether its input is positive or negative and produces a signal $b_n$ whose amplitude is set to $+v_{th}$ or $-v_{th}$, according to the input signal polarity. A second comparator COMP2 compares the input and the output of the comparator COMP1 for providing error information to an estimator (LMS) of the coefficients $c_i$. In a practical implementation, the comparator COMP1 may not be present because it can be seen as part of the sampling flip-flop FF1. In this case, for the generation of the sampling error information ($e_n$) the input and the output of the flip-flop FF1 can be directly monitored by any circuit adapted to perform the logical function of the comparator COMP2. Typically, Least Mean Squares (LMS) algorithms are employed to estimate the coefficients $c_i$ and find the best set of coefficients $c_i$ that minimizes the mean square error $e_n$ between the value of the expected bits (+/− a certain threshold $v_{th}$) and the received bits.

Whether a single estimated coefficient is used (simplest implementation with a single correction tap) or several coefficients are used (more refined implementation with several correction taps) for enhanced ISI deletion, to ensure correct behavior of a DFE circuit in terms of data recovery, a first or unique correction by the first ($c_1$) of the estimated coefficients is to be effected before sampling the next bit. To satisfy this requirement, the DFE feedback path for the first or unique estimated coefficient $c_1$ cannot have a signal propagation delay greater than the bit period ($T_{bit}$). Usually the propagation delay is smaller than the bit period. Often, receivers use a half rate clock, where the expression half-rate means that the frequency of the clock that generally is recovered from the incoming data bit stream is half that of the bit-rate of the transmitted data pulse signal, and both rising and falling edges are utilized to sample the incoming data.

Since the DFE corrects the incoming bit on account of the ISI of a single previous bit or of several previous bits, a DFE implementation as shown in FIG. 4 would necessarily be a full-rate system.

The DFE can be adapted to a half-rate clocking scheme of the receiver by using a multiplexer that selects which of the two samples (the data sampled by the rising clock edge and the one sampled by the falling clock edge) has to be alternately used as a previous bit (precursor bit) to be multiplied by the $c_i$ coefficient before being subtracted from the input bit (cursor bit), as with the exemplary circuit of FIG. 5.

The flip-flops FF1 and FF3 provide a sampled value of their input at the rising edge of the clock, while the flip-flops FF2 and FF4 provide a sampled value of their input at the falling edge of the clock. The multiplexers (2 1) select their input 1 on the high level of the clock, and their input 2 on the low level of the clock.

In this description, the clock ck of the multiplexers has been depicted as being the same clock of the flip-flops. However, it is possible to have a difference between the clock of the multiplexers and the clock of the flip-flops without changing the basic concept.

To reduce the propagation delay of the first DFE correction tap $c_1$, the circuit implementation of FIG. 5 may be modified as shown in FIG. 6. The data to be multiplexed is provided to sign_C1 from master latches LATCH1 and LATCH2 of the flip-flops FF1 and FF2. Eventually, the data is further amplified by a buffer stage LIMITING.

Applying the same concept described above for the sign_C1, the timing path for sign_C3 can be improved according to the architecture shown in FIG. 7, where the C3 tap multiplexer input data are the outputs of the master latches (LATCH5 and LATCH6) of the flip-flops FF3 and FF4 of the traditional DFE architecture of FIG. 5.

Because the data L5out and L6out come from a cascade of three regenerative latch stages, the amplifying stages LIMITING before the multiplexer inputs are not required, though they could nevertheless be added. This implementation can be generalized to any number of DFE taps just by adding a same number of pairs of latches in the shift register and respective multiplexers.

The use of a clocked DFE, with either a full-rate or a half-rate recovered clock signal, simplifies synchronization of previous-bit correction to the incoming bit. However, this implies that the propagation delays of the flip-flops (of the latches that compose them) and eventually of the multiplexers contribute to the first tap overall feedback delay.

Alternative techniques for implementing FIR filters without using a synchronization clock are well known and are used in high frequency applications. For example, reference is directed to the techniques disclosed in the article by H. Wu, J. Terno et al., "Differential 4-tap and 7-tap Transverse Filters in SiGe for 10 Gb/s Multimode Fiber Optic Link Equalization", IEEE ISSCC dig. of tech. papers, February 2003.

DFEs that include a FIR filter not synchronized by a clock in the feedback path is depicted in FIG. 8, for example, to illustrate a single tap DFE. A delay element of a nominal time value corresponding to one bit is inserted in the feedback path. This ensures the correct timing of the correction of the ISI superposed to the bit to be sampled in the received pulse signal.

Published patent application U.S. 2006/0239341 discloses a DFE in which the feedback signal has a continuous time waveform, and is obtained using a filter in the feedback path having a transfer function representing the reciprocal of the transfer function of the transmission channel. The alternative for a DFE operating in a continuous time domain is compatible both in a DFE synchronized by a clock, as well as for a DFE not synchronized by a clock.

SUMMARY OF THE INVENTION

Control of signal propagation delay in the feedback path, and optionally or alternatively of the bandwidth, may usefully be applied to a full-rate or a half-rate clocked DFE to achieve an equalization not only in the eye but also in the transition region.

The DFE technique may be used to delete ISI at or about the sampling point, that is, at the center of the eye. However, in accordance with the present invention, a specifically refined control of the propagation delay may be able to significantly enhance equalization also in the transition region (in which the value of a bit switches) and even an enlargement of the eye. As a consequence, data recovery may be less critical and the reliability of the receiver may be enhanced.

The technique may be based upon a clock recovery according to the well-known early-late technique (also know as the bang-bang technique) that is commonly performed by a dedicated circuit block of clock and data recovery (CDR). Such a technique of clock and data recovery is the subject of numerous publications and articles, among which include: [1] J. L. Sonntag and J. Stonick, "A Digital Clock and Data Recovery Architecture for Multi-Gigabit/s Binary Links", *IEEE J. Solid State Circuits*, vol. 41, no. 8, pp. 1867-1875, August 2006; [2] J. D. H. Alexander, "Clock Recovery from Random Binary Signals", *Electronics Letters*, vol. 11, pp. 541-542, October 1975.

The technique may exploit the ability of sampling the incoming pulse data bit stream with the main clock ck recovered at the receiver from the received bit stream and with a quadrature clock ckq thereof.

An early-late CDR technique commonly implies monitoring of the values sampled with the main clock ck and of the values sampled with the quadrature clock ckq.

The so-called late information is generated by detecting a difference between the value sampled by the clock $ck_i$ and the value sampled by the clock $ckq_i$ when a data transition is detected between the data sampled by the clock $ck_i$ and by the clock $ck_{i+1}$. Similarly, the so-called early information may be generated by detecting an equality between the value sampled by the clock $ck_i$ and the value sampled by the clock $ckq_i$ when a data transition is detected between the data sampled by the clock $ck_i$ and by the clock $ck_{i+1}$. This is equivalent to detecting a difference between the logic value sampled by the clock $ck_{i+1}$ and the logic value sampled by the clock $ckq_i$.

The early and late information, after having been processed by analog or digital filtering, may be normally used to advance or delay the sampling clock position to keep the sampling edge of the recovered clock signal at the middle of the data eye (i.e., the basic CDR function).

The technique advantageously provides an improved decision feedback equalizer (DFE) wherein the same early-late information that is used for controlling the position of the sampling clock edge (i.e., for the CDR function) may also be exploited for controlling the propagation delay in the feedback signal path of the DFE for enhancing equalization in the transition regions of the pulse data bit stream.

The DFE may have either a clocked, full-rate or half-rate synchronization or a continuous time controlled overall delay synchronization, and may be adaptable to any data communication channel, including intra-chip channels as well as inter-chip channels.

The DFE technique may include at least a feedback path delay control loop that, according to a preferred embodiment, may employ distinct selective early-late detectors for two or even more specific bit patterns of the data sampled by the recovered main clock and by a quadrature clock in the incoming bit stream. At least one of the bit patterns may contain one transition, for example, a XXY pattern or sequence. At least one other bit pattern may contain two transitions, for example, a YXY pattern or sequence.

Each early-late detector may output a conventionally attributed value in case it detects the occurrence of an early, for example, assuming an EPLN convention (Clock Early: Positive; Clock Late: Negative) is adopted, +1, a value of an opposite sign if it detects a late, for example, −1 or a zero if it detects either an equality between the second bit (X) and the third bit (Y) of the monitored pattern, or if the pattern does not correspond to the one monitored. Of course, any appropriate different sign convention may be adopted.

A significant difference between the patterns is that the same transition (XY) is not preceded by a transition in the case of the first pattern (XXY), and by contrast, is preceded by a transition in the case of the second pattern (YXY). The effect of the feedback path propagation delay (or bandwidth) on the last XY transition in a YXY or XXY pattern will be significant in the case of the second pattern (YXY). It will be relatively negligible in the case of the first pattern (XXY) that therefore may be taken as a reference or blank situation to assess the effect of the feedback path propagation delay of an immediately preceding transition.

The monitored patterns may even be composed of more than three consecutive bits, and more than two patterns may be monitored.

An accumulator algebraically may merge early-late information relative to two or more patterns being monitored. It may previously invert the sign of the value output by the detector of the pattern to be summed to the value output by the detector of the respective reference pattern, and to the current output value of the accumulator fed back to the summing node delayed by a bit period. The updated current output value of the accumulator of early-late information may be fed to a dedicated controller adapted to compare cumulated early-late value with at least a positive threshold, and with at least a negative threshold for coherently conveying corrective increment or decrement commands to a delay block and optionally also or alternatively to a bandwidth limiting block of the feedback path of the DFE.

The distinct selective early-late detectors may also provide the number of occurrences of the respective monitored specific bit patterns that have contributed to produce the correspondent early-late data provided to the accumulator. In this case, the accumulator may be adapted to momentarily stop accumulation of early-late data of bit patterns other than a bit pattern found to have become significantly less frequent in the bit stream, for as long as new or fresh early-late information for such a momentarily infrequent bit pattern is generated anew, reducing the unbalance.

BRIEF DESCRIPTION OF THE DRAWINGS

Detailed description of preferred embodiments will be made with reference to the attached drawings. The detailed description is not to be taken in a limiting sense, but is provided for the purpose of illustrating the general principles of the invention.

DETAILED DESCRIPTION OF THE PREFERRED EMBODIMENTS

Figure 9:
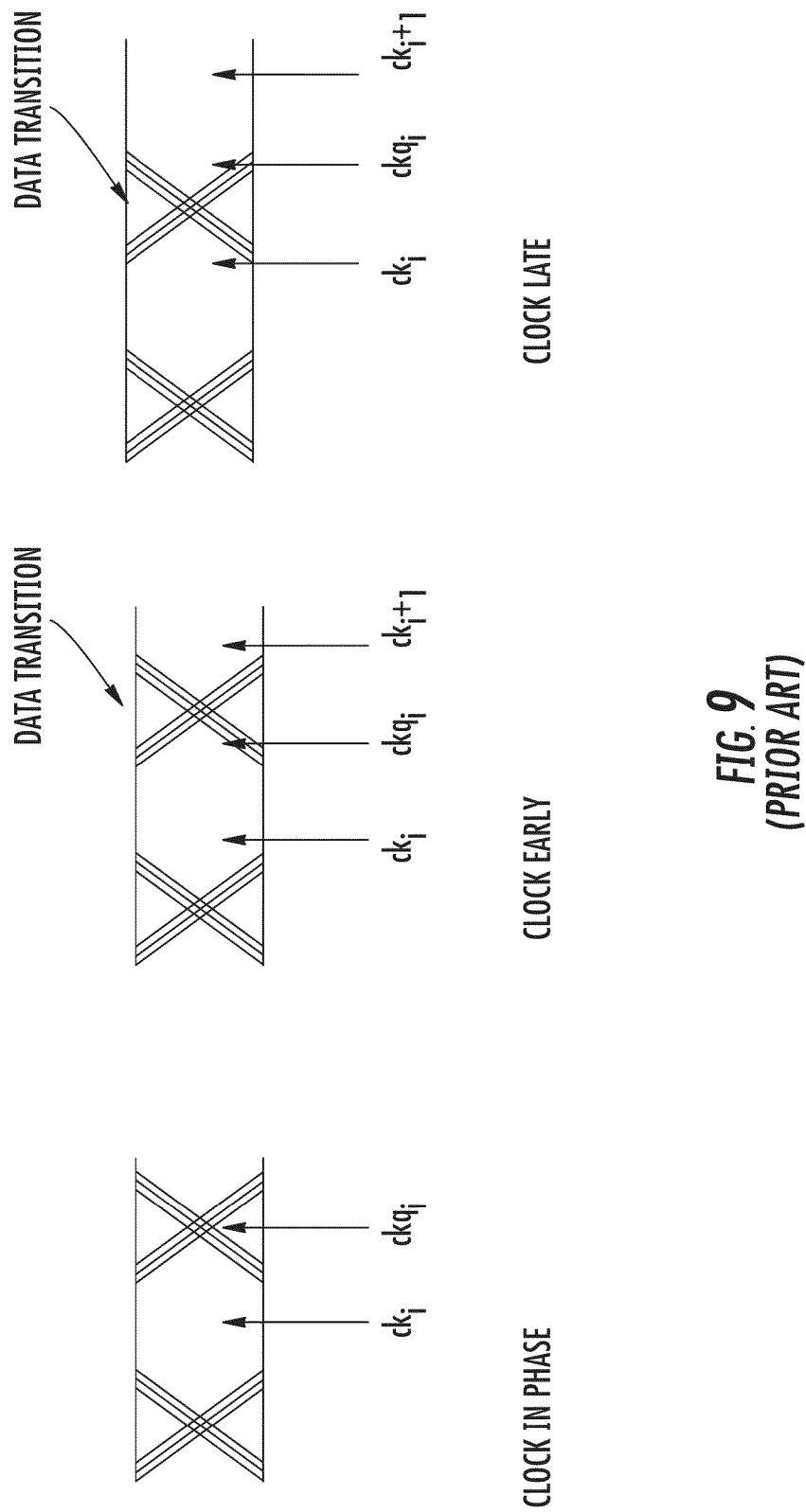
FIG. 9 illustrates how early or late information is gathered from the received bit stream, to be digitally processed and eventually used to advance or delay the sampling clock position to keep the clock at the middle of the data "eye" in accordance with the prior art.

FIG. 9 illustrates how early-late information is obtained in a common circuit block CDR, highlighting how the operation is practically equal to sensing an equality or a difference between the sampled value (sign) with the clock $ck_{i+1}$ and the value (sign) sampled with the clock $ckq_i$ when a transition occurs.

Figure 10:
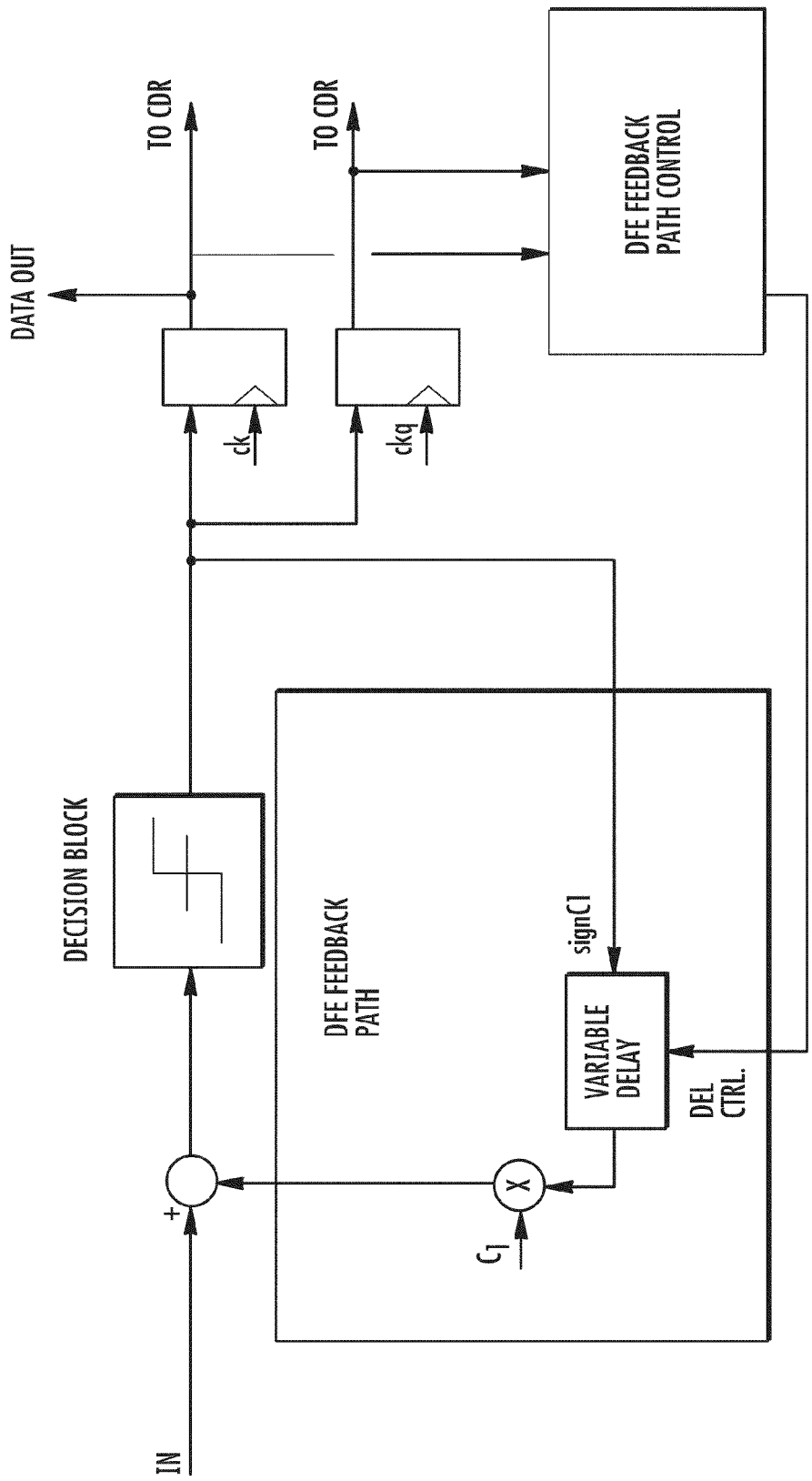
FIG. 10 is a generalized functional block diagram of an embodiment of the DFE equalizer functioning in a continuous time mode in accordance with the present invention.

The main architecture of the enhanced DFE is depicted for an exemplary application to a non-synchronized embodiment of the DFE, as illustrated by the block diagram of FIG. 10. In this illustrated embodiment, a single correction step is contemplated (through a first pre-estimated coefficient).

The DFE feedback signal path may be represented as receiving the sign value of the previous bit (sign_C1) and feeding back this value to the input of the DFE circuit multiplied by an estimated coefficient $c_1$ after passing through a variable delay circuit VARIABLE DELAY controlled by an appropriate control circuit DFE FEEDBACK PATH CONTROL.

A sign_C1 signal representing the value of the previous bit is fed to the feedback path of the DFE by a circuit block PREVIOUS BIT FEEDER that may include clocked sampling elements, to be eventually fed back to an input node of the DFE. This is after having been multiplied by a DFE tap coefficient $c_1$ that is adapted to the characteristics of the transmission channel to compensate for the ISI of the preceding bit, according to a common functional architecture of any DFE equalizer.

According to one aspect of the DFE as discussed herein, the values sampled by the quadrature clock ckq (nominally at the position of the expected data transition) and by the main clock ck (nominally at the position of the center of the eye) intended to be fed to the CDR block that produces the best sampling phase to sample the incoming data in the middle of the eye (for example, through an early-late or bang-bang technique), are also input to a DFE FEEDBACK PATH CONTROL block whose function is to use the early-late (EL) data to control the overall signal propagation delay of the feedback path of the DFE. This control may be implemented by controlling a controllable delay circuit VARIABLE DELAY.

Figure 1:
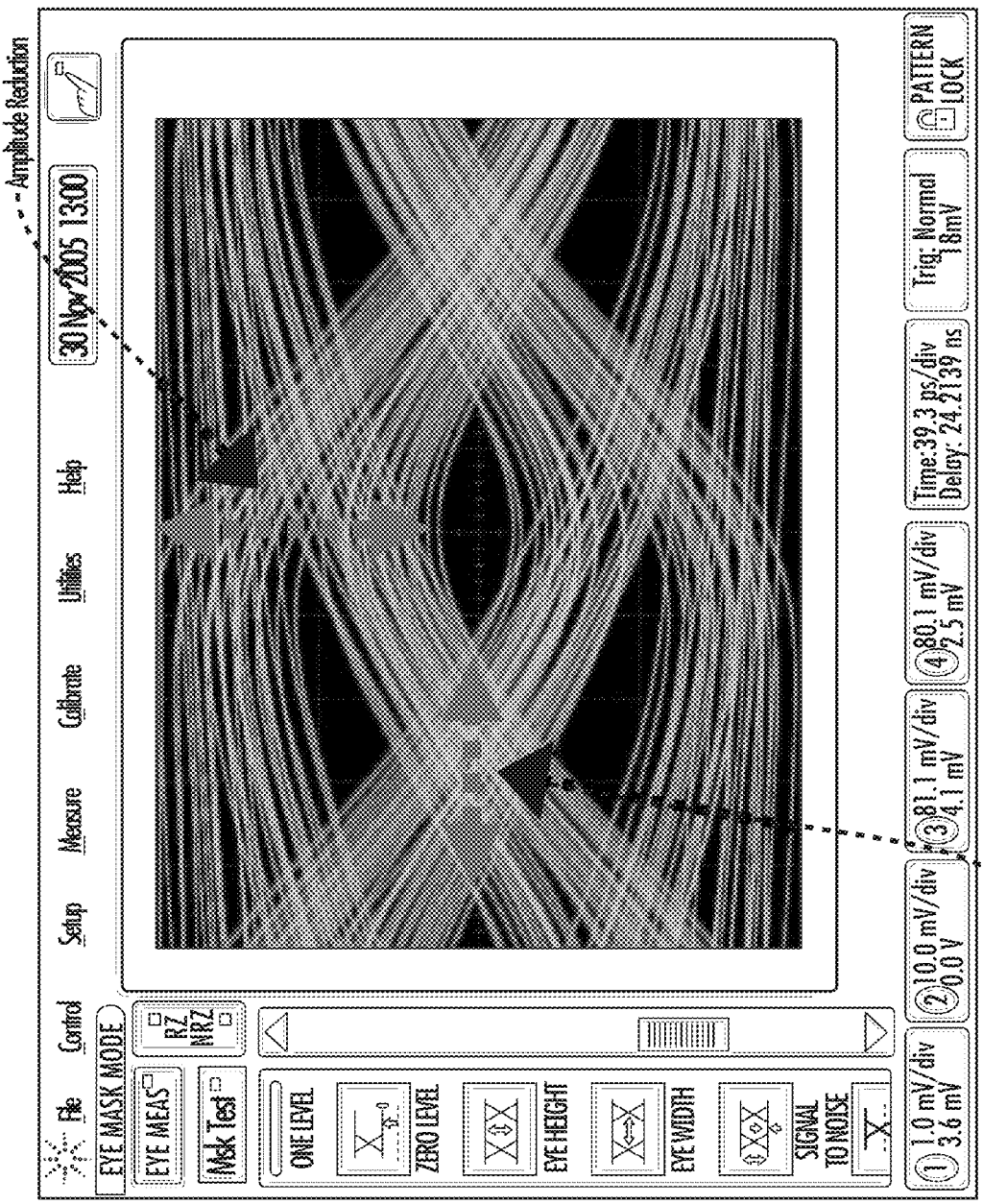
FIG. 1 is a photographic reproduction of an oscilloscopic image of a signal analyzer showing the timing jitter and amplitude reduction effects in a received data pulse signal in accordance with the prior art.
Figure 2:
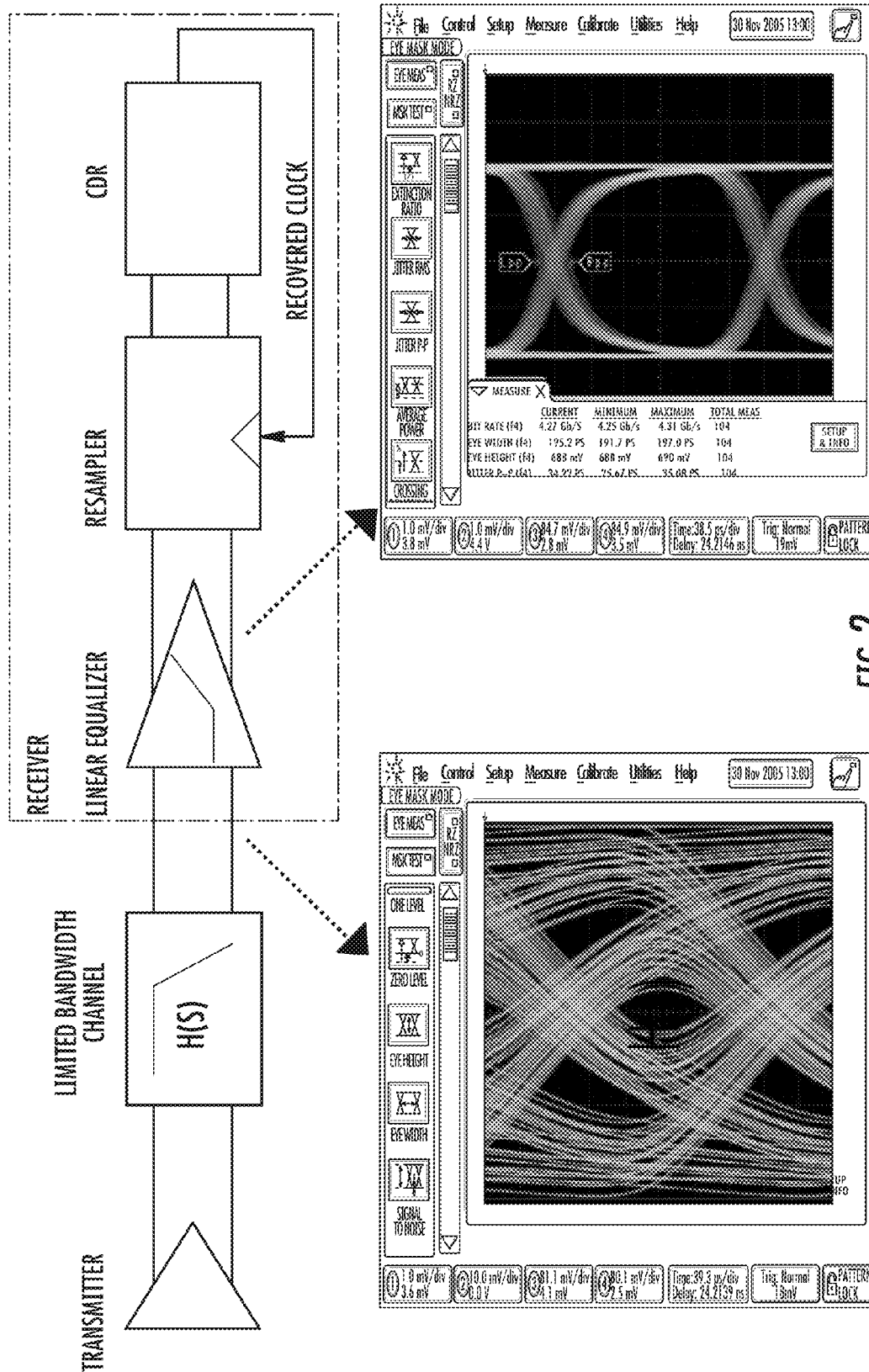
FIG. 2 is a typical block diagram of a serial data transmission chain and related oscilloscopic images showing the effect of the linear equalizer commonly used at the receiver input in accordance with the prior art.
Figure 3:
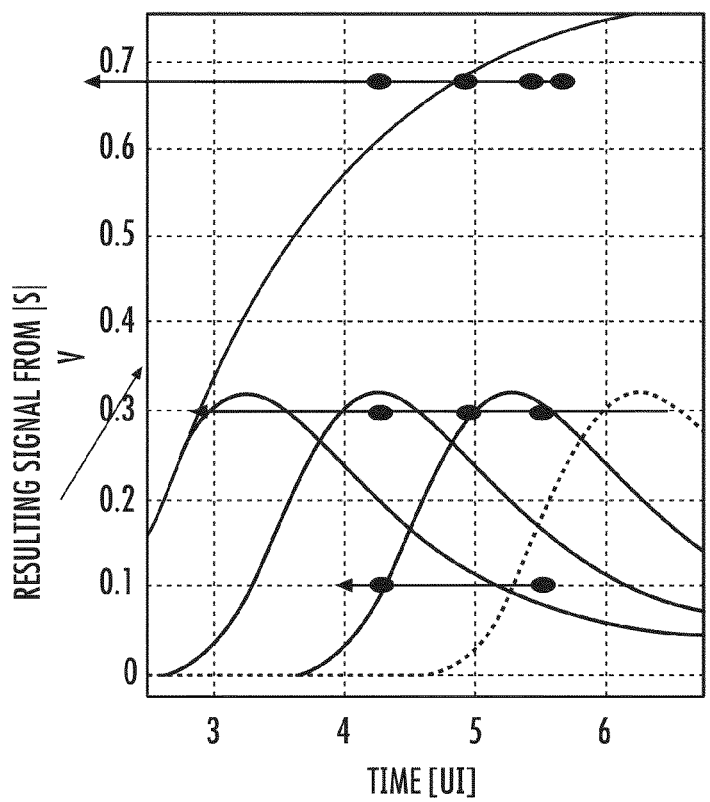
FIGS. 3a and 3b illustrate generation of ISI by additive contributions to the measured value in a sequence of individual unitary pulse responses and the meaning of the estimated $c_i$ coefficients (contributive weight of antecedent or precursor, and successive or postcursor bits) as values of a certain individual unitary pulse response propagating through the channel, spaced by a unitary bit length interval (UI) in accordance with the prior art.
Figure 3:
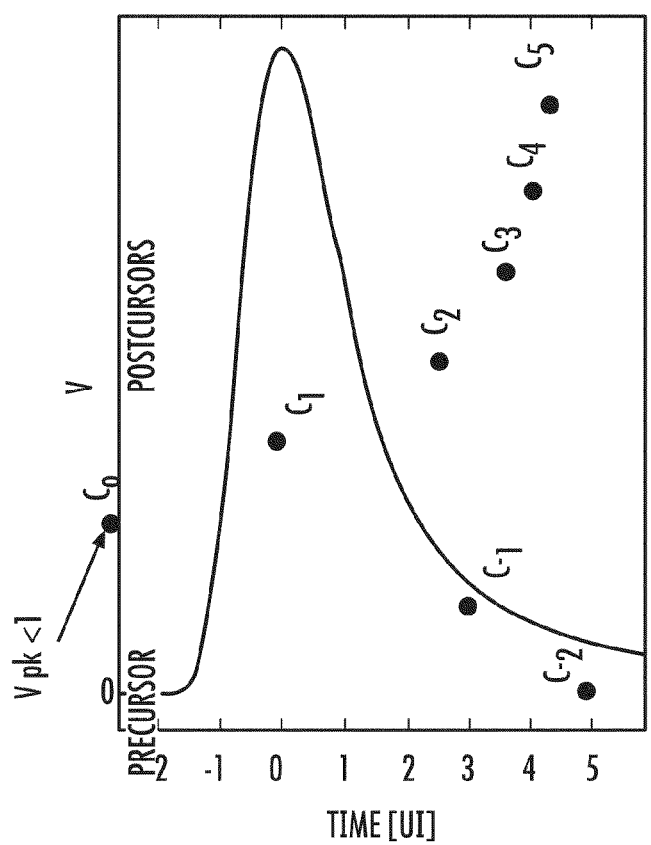
Figure 4:
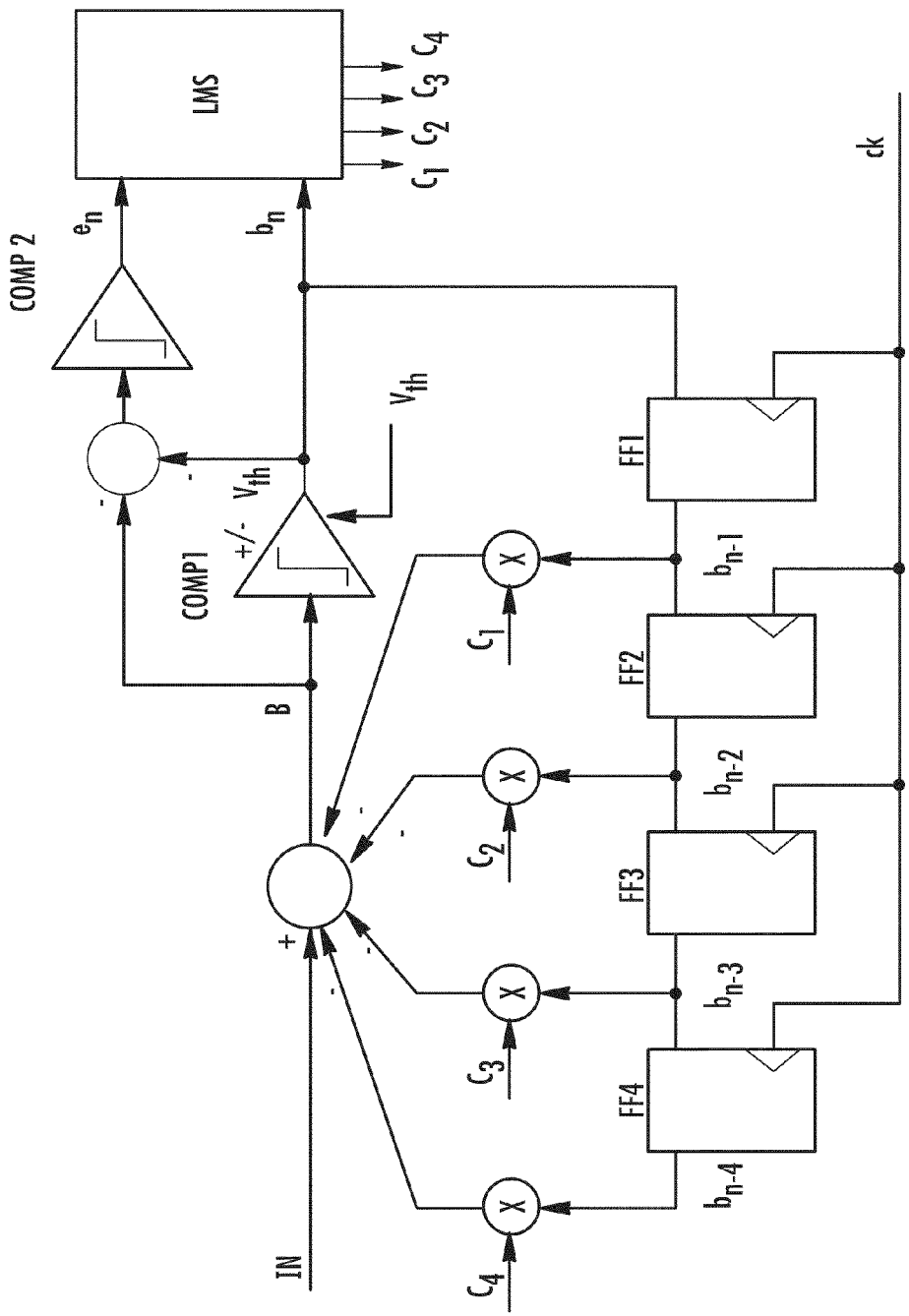
FIG. 4 is an exemplary functional diagram of a DFE for a receiver with a full-rate clocking scheme in accordance with the prior art.
Figure 5:
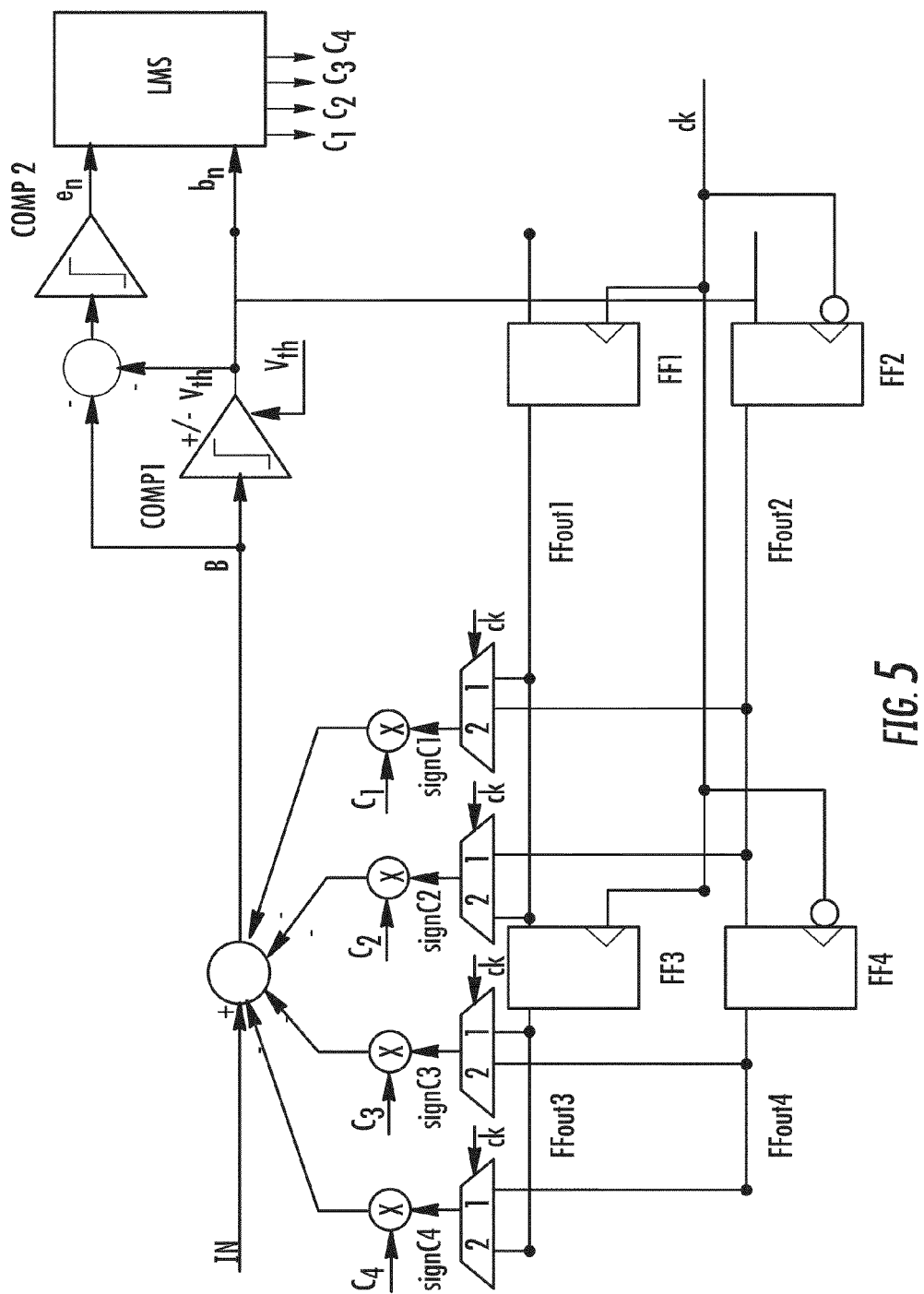
FIG. 5 is an exemplary circuit block diagram of a DFE for the case of a half-rate clocking scheme of the receiver in accordance with the prior art.
Figure 6:
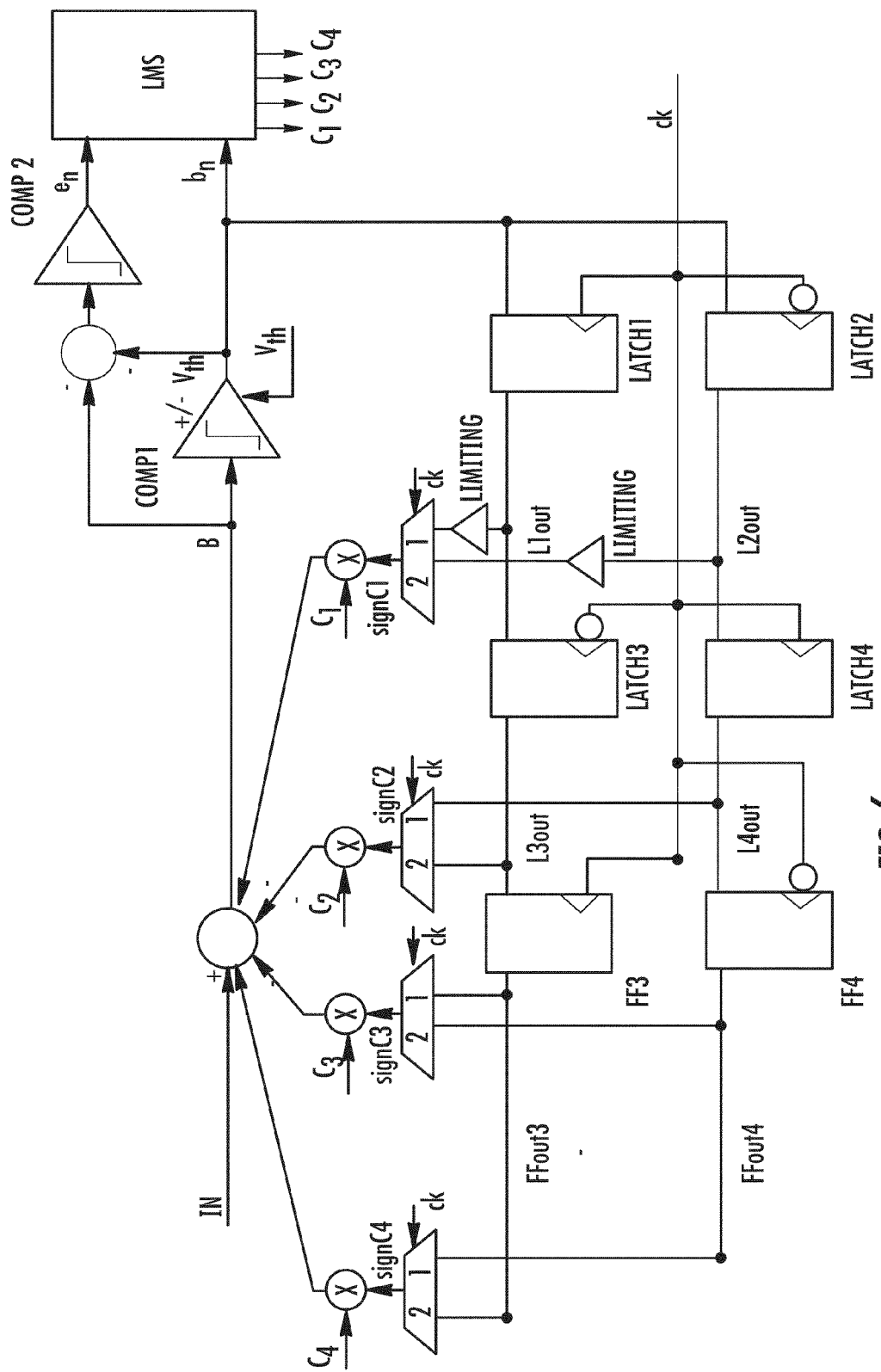
FIG. 6 is a modified circuit block diagram for a half-rate DFE implementation for reducing propagation delay in the feedback loop relative to the first coefficient $c_1$ in accordance with the prior art.
Figure 7:
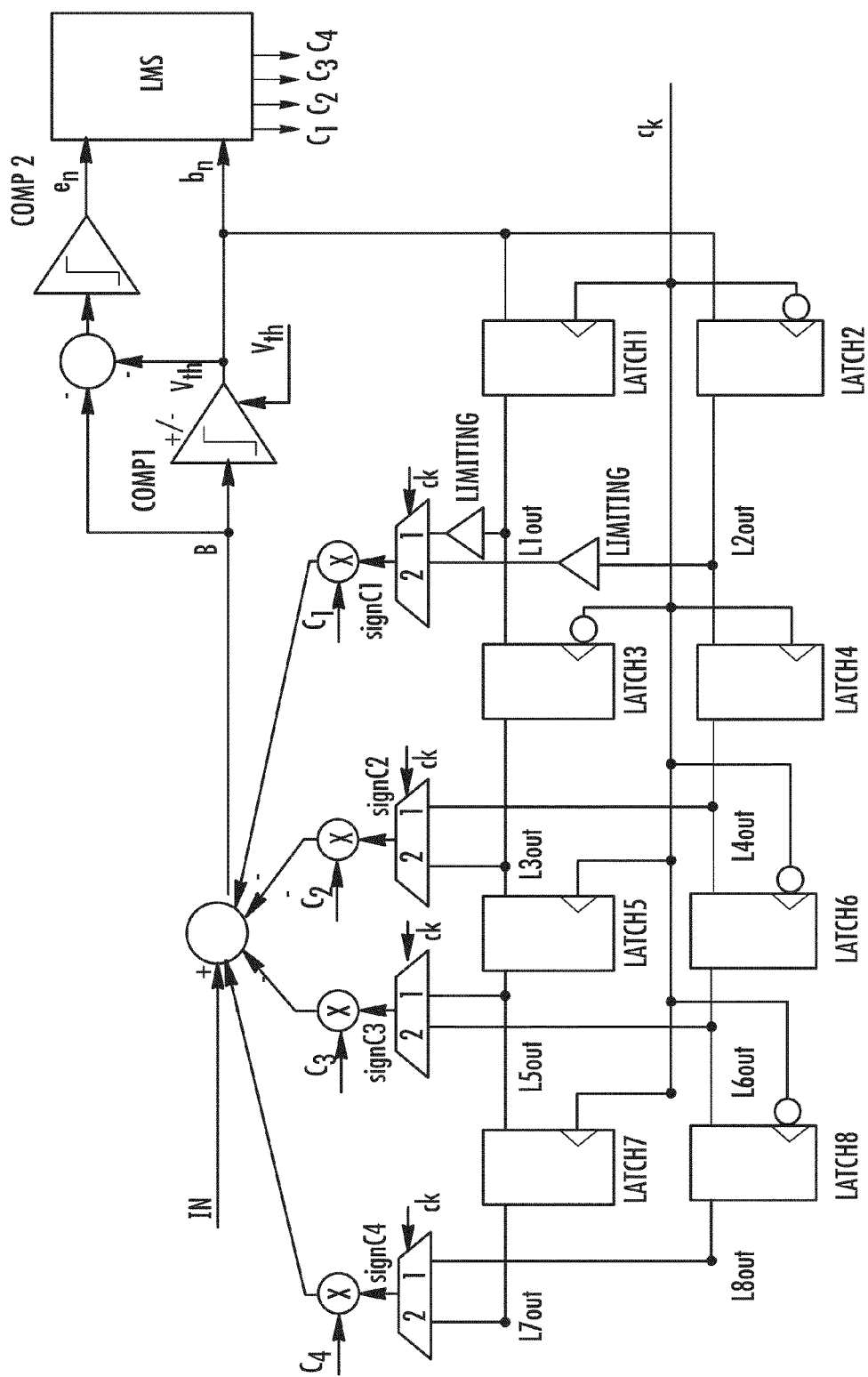
FIG. 7 is a further improved block diagram for reducing feedback signal propagation delay that may be generalized for any number of DFE correction taps relative to as many coefficients $c_i$ in accordance with the prior art.
Figure 11:
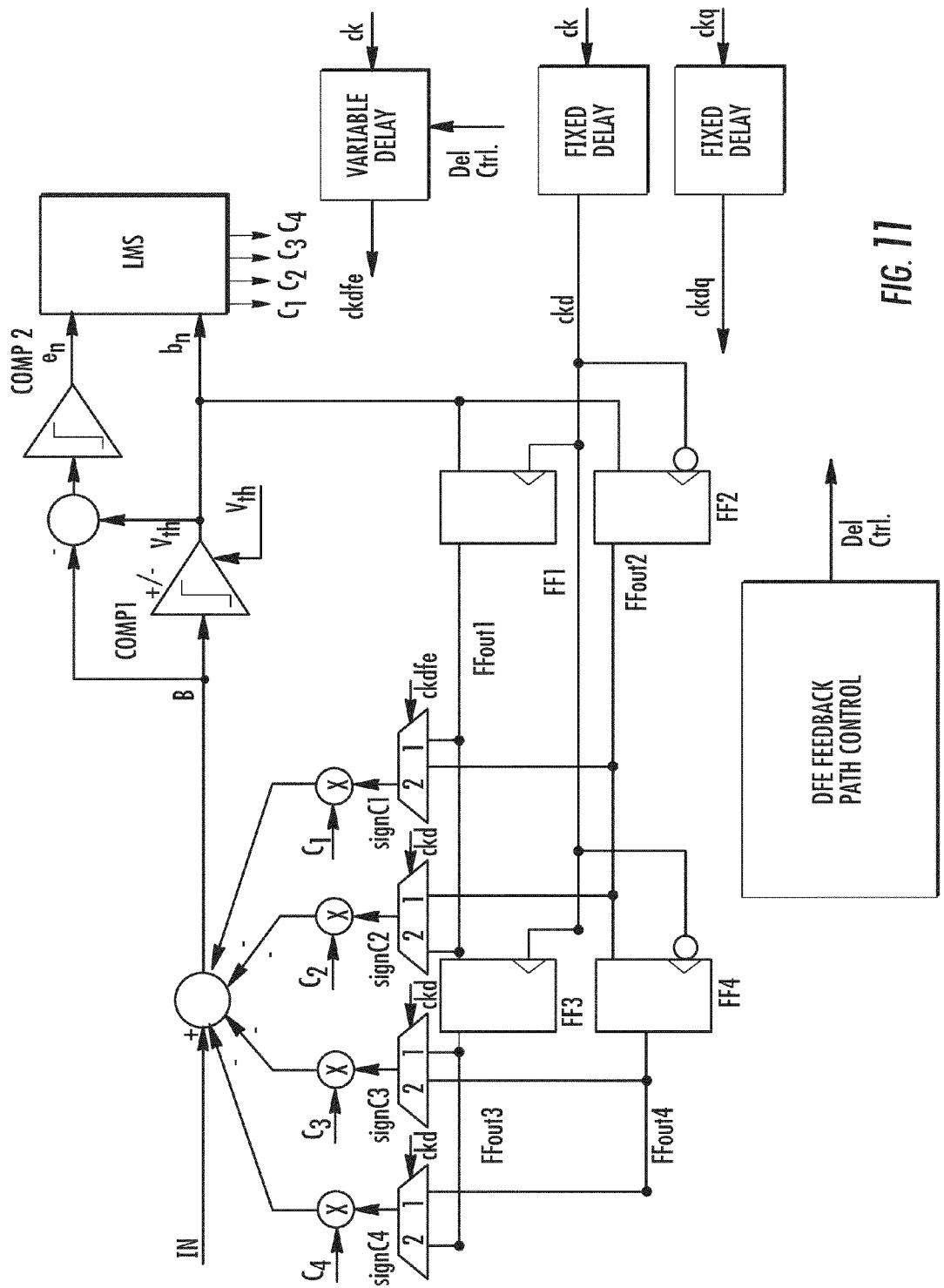
FIG. 11 is a functional block diagram of an alternative embodiment of the DFE equalizer functioning in a synchronous mode in accordance with the present invention.

FIG. 11 illustrates an exemplary embodiment of the DFE functioning in a synchronous mode, as an alternative to the DFE architecture already described above in reference to FIG. 5, wherein four correction taps with four respective estimated coefficients are contemplated.

In this case, the delay block VARIABLE DELAY, controlled by the control signal DEL_CTRL generated by the block DFE FEEDBACK PATH CONTROL acts on the clock ckdfe that commands the selection multiplexer of the bit that precedes the bit being sampled to be supplied to the multiplier by the first coefficient c1.

Figure 12:
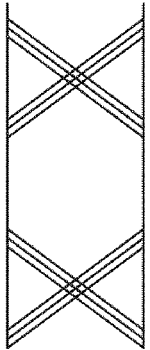
FIG. 12 compares graphically the effects of a known DFE with those of a DFE of the same type realized in accordance with the present invention.
Figure 12:
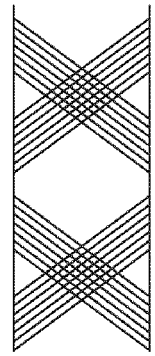
Figure 12:
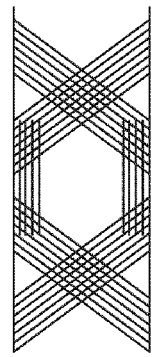

FIG. 12 illustrates the effect of the DFE technique in deleting the ISI from the sampling point, that is, at the middle of the so-called eye. Also illustrated is how the specific control of the propagation delay of the signal in the feedback path allows a significant increase in the equalization and in the transition regions.

The DFE FEEDBACK PATH CONTROL block employs selective detectors of early-late information (EL) associated to specific bit patterns (XXY, YXY) that are selected to be monitored in the received bit stream. According to a preferred embodiment, each selective detector used, beside a capability of gathering EL data associated to the selectively monitored bit pattern, may also have the ability of counting the number of occurrences of the respectively monitored bit pattern that have produced contributions to the collected EL data for the specific bit pattern.

Figure 13:
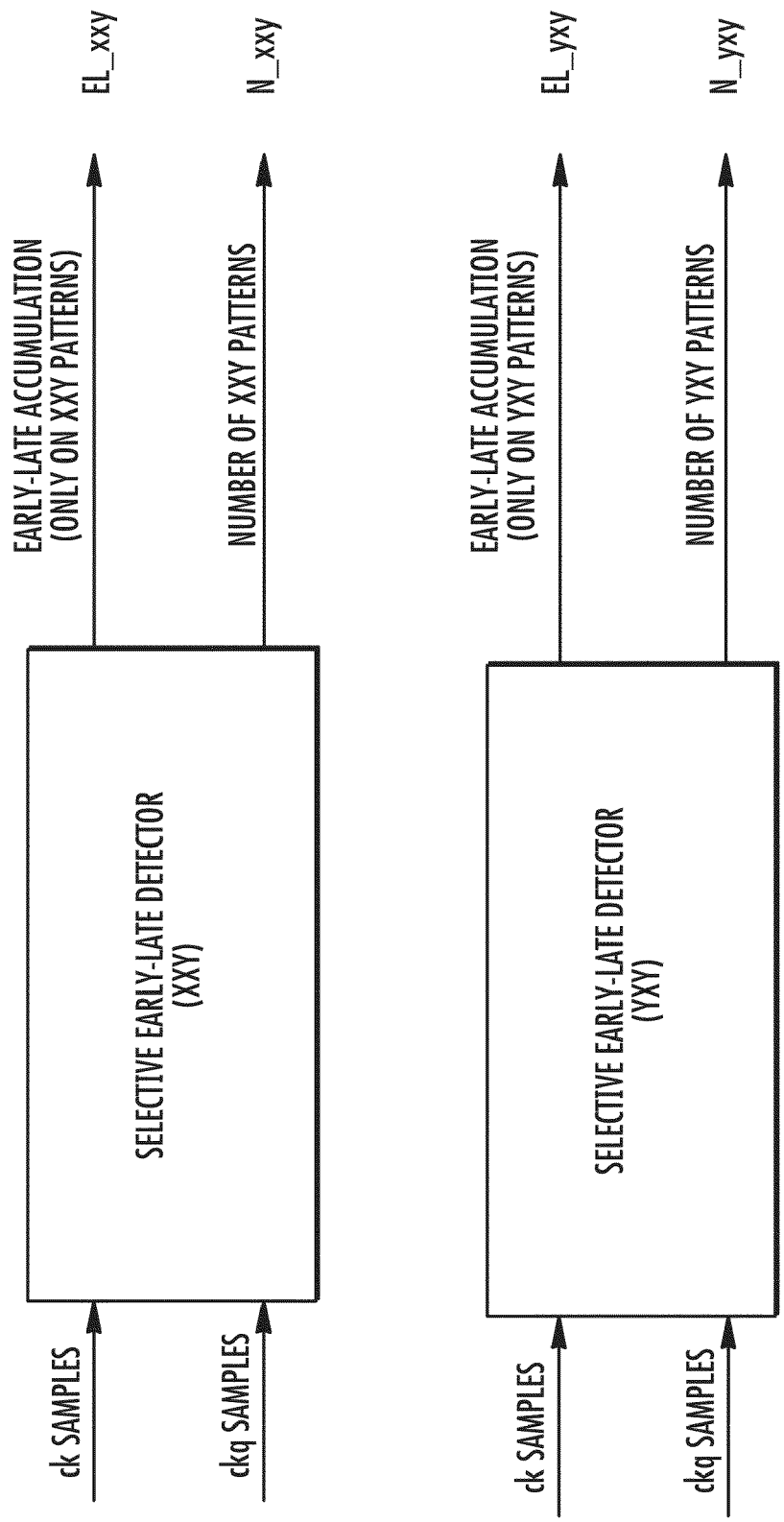
FIG. 13 exemplarily details two selective early-late detectors employed in the DFE feedback path control block diagram of FIG. 10 or 11, monitoring a XXY bit pattern and a YXY bit pattern, respectively, in the received bit stream in accordance with the present invention.

FIG. 13 shows an exemplary circuit diagram of two SELECTIVE EARLY-LATE DETECTOR blocks for two specific bit patterns to be monitored having such an ancillary capability of counting the number of contributory occurrences. Considering by way of an example two different bit patterns indicated as XXY and YXY, the pattern XXY can be 110 or 001, and the pattern YXY can be 101 or 010.

Both of these patterns have a data transition between the second bit and the third bit. Therefore, both patterns are amenable to causing the detection of early and late conditions of alignment of the sampling clock by respective SELECTIVE EARLY-LATE DETECTOR blocks.

The block SELECTIVE EARLY-LATE DETECTOR associated to the pattern XXY generates early-late data associated to the XY data transition when the previous bit is identical to the second bit of the pattern, otherwise its output is zeroed. When the sequence corresponds to the monitored pattern, the output data may be +1, −1 or 0, depending on whether an early, a late or an equality of sampled values is assessed by samplings conducted according to the classical early-late CDR scheme already described with reference to FIG. 9.

The block SELECTIVE EARLY-LATE DETECTOR associated to the pattern YXY generates early-late data associated to the XY data transition when the previous bit is different from the second bit of the pattern, otherwise its output is zeroed. When the sequence corresponds to the monitored pattern, the output data may be +1, −1 or 0, depending on whether an early, a late or an equality of sampled values is assessed by samplings conducted according to the early-late CDR scheme already described with reference to FIG. 9.

Figure 14:
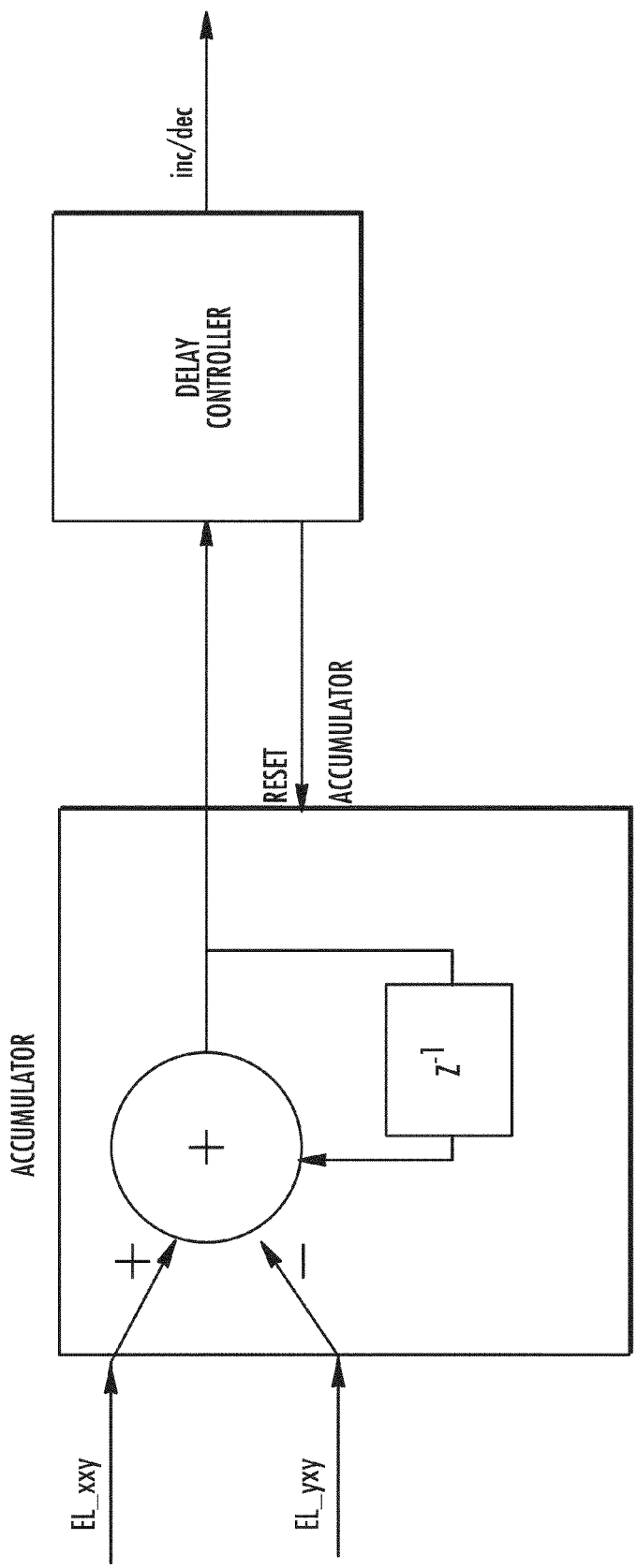
FIG. 14 depicts a resettable accumulator receiving early-late data produced by the selective early-late detectors of FIG. 13 and a bandwidth and delay controller that issues appropriate increment/decrement commands to respective functional control blocks of the bandwidth and/or of the overall delay of signal propagation along the feedback signal path of the DFE in accordance with the present invention.

As shown in FIG. 14, the two SELECTIVE EARLY-LATE DETECTOR blocks feed their respectively generated EL data to dedicated inputs of an ACCUMULATOR block. The function of the ACCUMULATOR block is to invert the sign of the value output by the detector of EL data of the YXY pattern, and to merge the inverted-sign EL data with the non-inverted EL data produced by the detector of the other pattern XXY. The current output value of the accumulator is fed back to the summing node delayed by a bit period by the $Z^{-1}$ stage.

The updated output value of the block ACCUMULATOR is fed to a BANDWIDTH AND DELAY CONTROLLER block that may include additional digital filtering of the input value through at least a positive and a negative threshold, or through a stepwise set of thresholds, or even though a circular arrangement of a recurrent sequence of different thresholds. The thresholds may range from a negative quadrant to a positive quadrant for finally issuing coherent increment/decrement commands to the VARIABLE DELAY block to minimize or reduce the rate of occurrence of early-late detections.

The SELECTIVE EARLY-LATE DETECTOR of a specific bit pattern receives streams of bits sampled by the main clock ck nominally in the middle of the eye, and by the quadrature clock ckq nominally at the edge of the eye. The stream of sampled bits may be fed to the SELECTIVE EARLY-LATE DETECTOR through a single wire at the same rate of the incoming data, or alternatively through multiple wires at a proportionately lower rate by employing demultiplexers interposed between the data samplers and the SELECTIVE EARLY-LATE DETECTOR. Each bit sampled by the clock ck is associated to the respective bit, sampled by the clock ckq, for making possible the detection of an early or a late event by comparing the bit sampled by the ckq with the bit sampled by the $ck_{i+1}$. The early or late event is detected by verifying a difference or an equality between the two sampled values according to an EL logic, for example, generating a +1 or a −1 in case of inequality or equality. Because the missing of a transition between the bit sampled by the clock $ck_i$ and the clock $ck_{i+1}$ causes detection of an equality, the equality detection is zeroed in case the bit sampled by the clock $ck_i$ and the clock $ck_{i+1}$ are found to be equal. The result is a number that can be +1, −1 or 0.

The SELECTIVE EARLY-LATE DETECTOR checks also the value of the preceding bit (or bits) to validate the occurrence of the specified pattern being monitored. In case the pattern does not match with the specified pattern, the result is zeroed regardless of its value.

As a result of this process, according to the EPLN convention, a +1, −1 or 0 is generated for each couple of bits. According to one alternative embodiment, these numbers may even be summed together to produce an early-late cumulated value that is eventually fed to the ACCUMULATOR.

Each SELECTIVE EARLY-LATE DETECTOR block performs the calculation at the rate of the bit stream it receives, that is, at the incoming data rate, in case a demultiplexer is not employed or at a reduced rate in case a demultiplexer is employed. Each SELECTIVE EARLY-LATE DETECTOR block is to be intended as a digital machine that receives an adequate clock at the same rate of the incoming received bit streams, and produces at each clock event an Early-Late Accumulation value resulting from the above analysis on the received bit stream.

The ACCUMULATOR block is to be intended as a digital machine that performs the function of a digital accumulator. At each clock event, the difference between the early-late values received from two different SELECTIVE EARLY-LATE DETECTOR blocks, in the considered example for the XXY and, inverted in sign, for the YXY patterns, are added to the previous output value of the ACCUMULATOR, thus updating it.

The DELAY CONTROLLER is a digital state machine adapted to output digital words that control the overall delay of the feedback signal path of the DFE, by acting on programmable delay elements or variable filters or other equivalent circuits functioning as a digitally controlled delay or as bandwidth limiting elements.

The increments and/or decrements commanded by surpassing of a certain threshold may be of a uniform magnitude or be differently programmed for a set of more than two thresholds organized in a staircase or circular fashion.

The DELAY CONTROLLER performs a comparison of the value produced by the ACCUMULATOR block with at least a positive and a negative threshold. The DELAY CONTROLLER increments or decrements its digital outputs that directly controls delay or bandwidth control circuits, or other circuits that have an adjustable effect on the propagation delay of the signal. This is for compensating ISI along the feedback path of the DFE, or coherently of more of these circuits if present when one of the respective thresholds is reached.

Therefore, a late clock event, conventionally producing a negative value −1 detected for the YXY pattern in consideration of the fact that it is applied to the inverting input of the ACCUMULATOR block, shall contribute toward the production of a positive cumulated value at the output of the accumulator. The positive cumulated value would eventually lead to the generation of an increment command of the overall signal propagation delay through the feedback path of the DFE upon surpassing a positive threshold by the controller.

Figure 15:
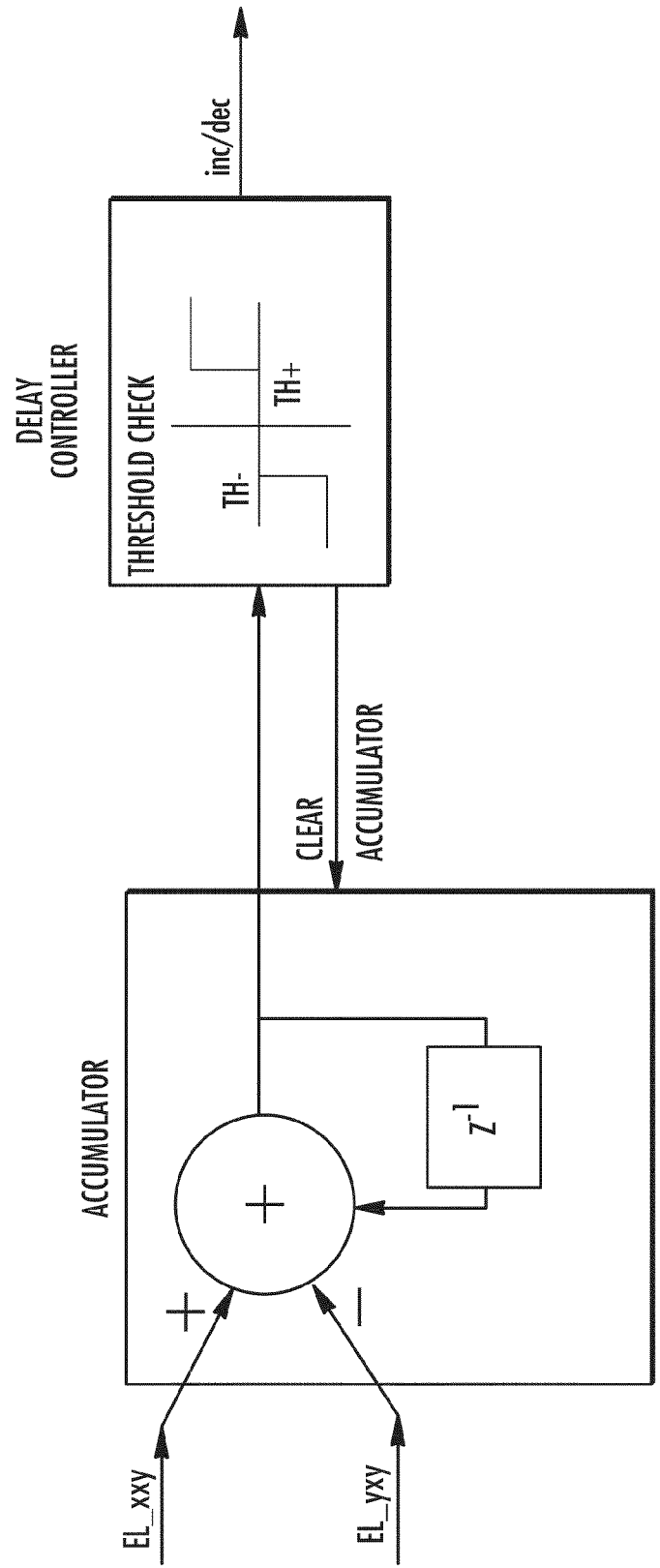
FIG. 15 shows processing performed by the delay controller in accordance with the present invention.

Moreover, when the block CONTROLLER modifies the output data (by incrementing or decrementing it) when one of the thresholds is surpassed, it may also simultaneously resets the ACCUMULATOR block that, as depicted in the exemplary diagram of FIG. 15, may be reset.

Figure 16:
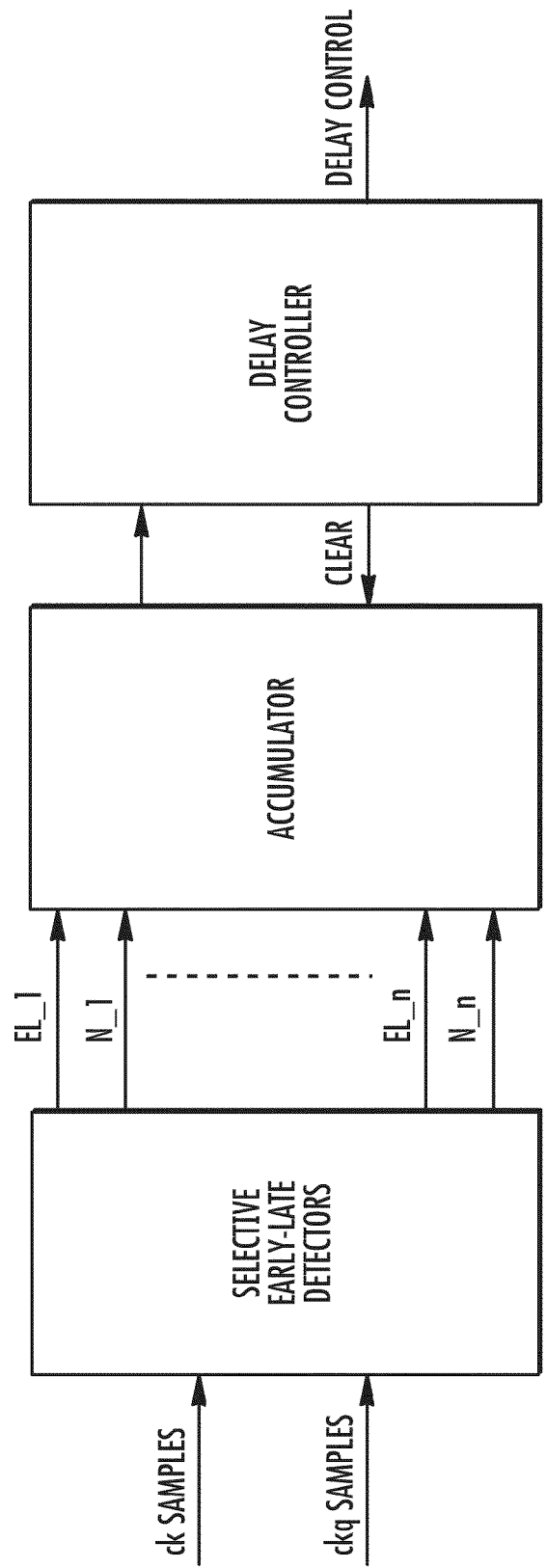
FIG. 16 is a complete block diagram of the DFE feedback path control block of FIGS. 10 and 11 according to a first embodiment of the present invention.

Alternatively, the set of thresholds may be circular or be similarly conditioned such to avoid any need of resetting the ACCUMULATOR block. The DELAY CONTROLLER may be implemented in numerous alternative manners as will be immediately recognized by those skilled in the art. For example, it may be based upon proportional-integrative-derivative (PID) techniques, well known for those skilled in the art with respect to control system theory. FIG. 16 is a general block diagram of the DFE FEEDBACK PATH CONTROL block of FIGS. 10 and 11, showing the possibility that more than two specified bit patterns are to be monitored.

Theoretically, any number n of different patterns could be checked by employing an equal number n of SELECTIVE EARLY-LATE DETECTOR blocks. The individual EL information gathered may be eventually processed by a plurality of ACCUMULATOR blocks feeding a plurality of DELAY CONTROLLER blocks that eventually increase or decrease the overall delay, or alternatively decrease or increase the bandwidth of a plurality of the feedback paths of a multi-tap DFE for obtaining the desired effect on the propagation delay.

Performances may be further enhanced by conditioning the accumulation of early and late data (EL_i) produced by the SELECTIVE EARLY-LATE DETECTOR blocks of the specific bit patterns being monitored. This may be done by processing also the numerous (N_i) contributory events for the distinct bit patterns to the cumulative early and late data, where the index i refers to the specific checked pattern.

Figure 17:
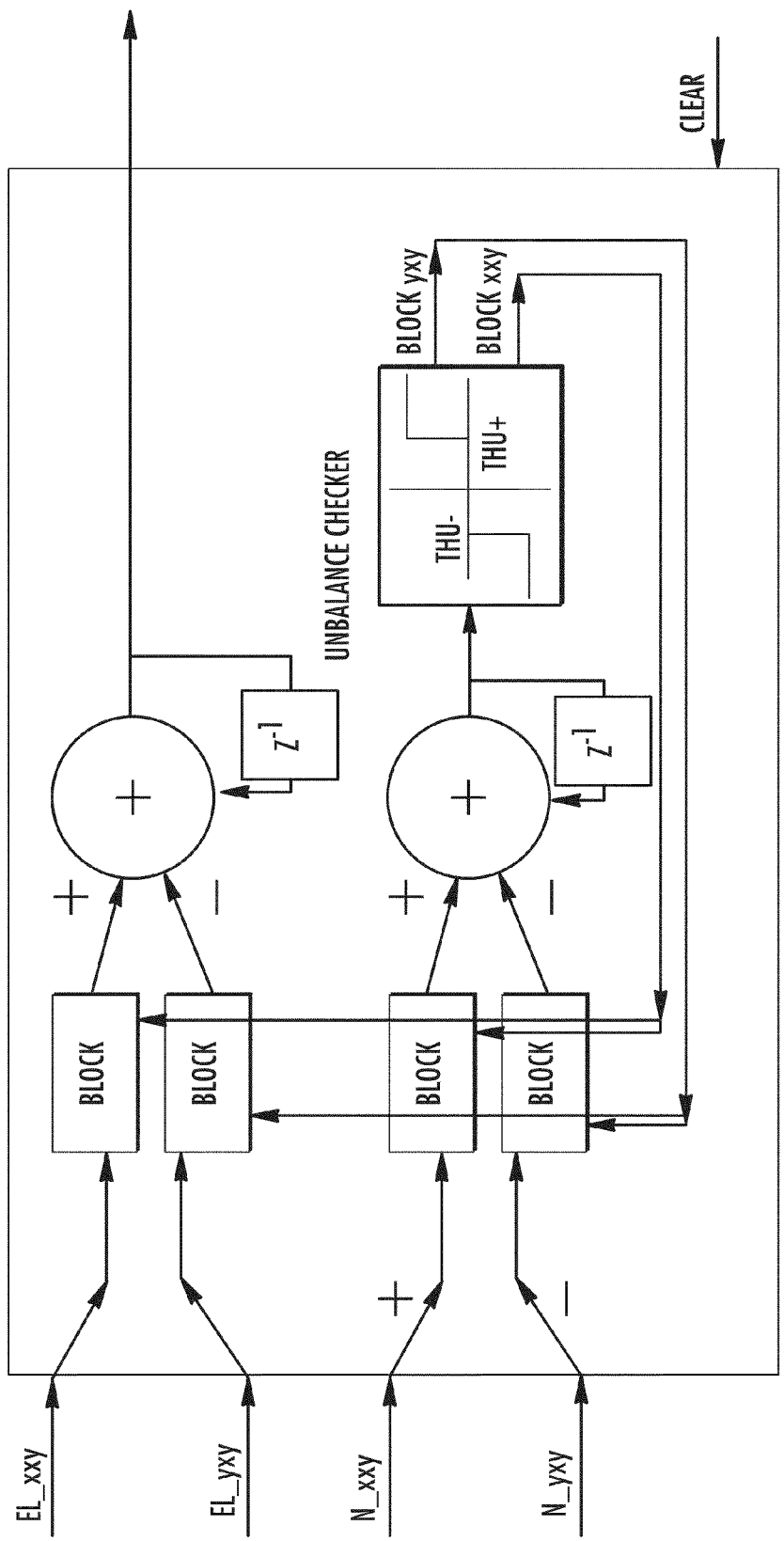
FIG. 17 shows an alternative structure of a resettable accumulator according to a preferred embodiment of the present invention making use of the ancillary information on the numerous contributory occurrences of the different bit patterns being selectively monitored.

Such an improved accumulator makes use of the recorded numerous values N_i provided by the SELECTIVE EARLY-LATE DETECTOR blocks to stop accumulation of early-late data generated by the SELECTIVE EARLY-LATE DETECTOR for pattern j when an excessive unbalance is detected between N_i and N_j. An exemplary embodiment for two monitored bit patterns XXY and YXY is shown in FIG. 17.

According to such a preferred embodiment, an UNBALANCE CHECKER block present in such an ACCUMULATOR block is adapted to stop the accumulation of early-late (EL) data if a certain preset maximum unbalance is reached between the numerous N_xxy and N_yxy of respective contributory occurrences of the two different bit patterns being monitored.

In this way, when one of the monitored patterns becomes much less represented in the received bit stream than the other selected patterns being monitored, their respective accumulations are halted to wait for early-late information coming from the pattern that has become less represented. The end result, on average, will be that the accumulations of EL_xxy and EL_yxy will tend to take into account the same number of events for both monitored patterns.

The operating principle of the DFE FEEDBACK PATH CONTROL block in effectively equalizing the transition region will be described in reference to the exemplary application to an unclocked continuous time DFE shown in FIG. 10.

In the unclocked continuous time DFE of FIG. 10, for the case of the pattern XXY, the bit that will drive the DFE to correct the ISI on the third bit (Y) is the bit X. However, the same bit X was already driving the DFE to correct the ISI on the second bit (X) because the first and the second bit have the same value. Because the DFE does not change its corrective action between the second and the third bit, the delay of the path does not substantively affect the transition between the second and the third bit.

Figure 8:
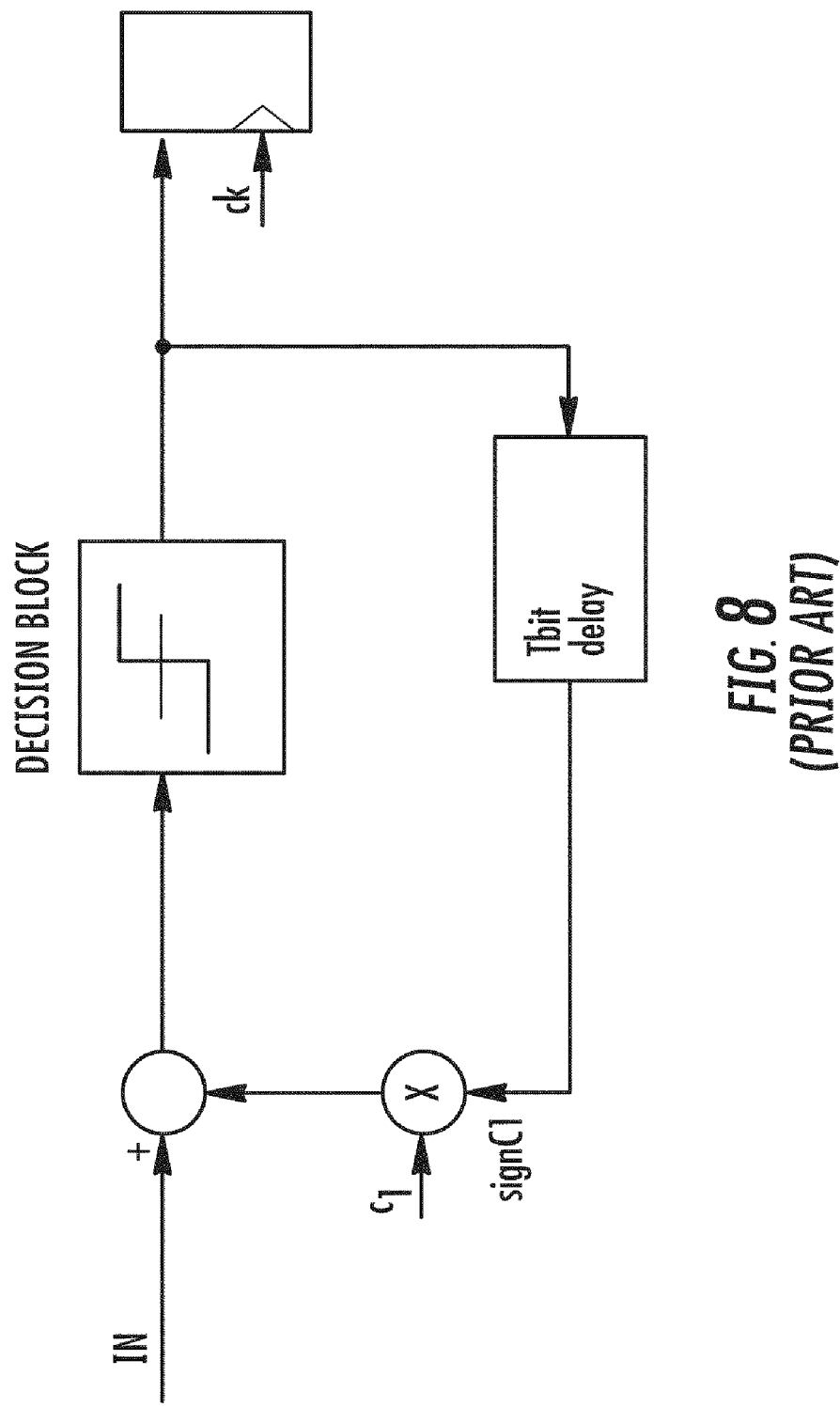
FIG. 8 illustrates an alternative architecture of a DFE loop functioning in a continuous time mode in accordance with the prior art.

In contrast, in an unclocked continuous time DFE as the one depicted in FIG. 8, for the pattern XXY, the bit that will drive the DFE to correct the ISI on the third bit (Y) is the bit X. In this case, a different bit (Y) was driving the DFE to correct the ISI on the second bit (X) because the first and the second bit have different values. In this case, the DFE changes its corrective action between the second and the third bit, and the signal propagation delay of the path including that introduced by the bandwidth limiting stage does affect the transition between the second and the third bit.

The result is that for a fixed position of the quadrature clock ckq, different early-late information will be generated for the patterns XXY or YXY because the transition between the second and the third bit does not occur at the same instant of the bit period.

The improved DFE as discussed above has a control loop that forces an unbalance between the early-late accumulation from the pattern XXY and from the pattern YXY to be null on average, by regulating delay limiting elements present in the feedback path of the DFE that ultimately causes, on average, the data transitions to occur at the same instant of the bit period.

That which is claimed is:

1. A decision feedback equalizer comprising:
   an input path configured to receive a bitstream with inter-symbol interference;
   a feedback signal path coupled to said input path and configured to correct a sampled value of an incoming bit of the bitstream based on inter-symbol interference of a preceding bit, said feedback signal path comprising a controllable delay circuit configured to receive the preceding bit; and
   a feedback path controller coupled to said controllable delay circuit to regulate a delay introduced to the preceding bit, the delay being a function of an accumulated value of data of early-late events of a sampling instant of the bitstream for a plurality of different data pulse patterns.

2. The decision feedback equalizer of claim 1, wherein said feedback signal path further comprises a multiplier having a first input coupled to an output of said controllable delay circuit, and a second input configured to receive an estimated correction coefficient of inter-symbol interference.

3. The decision feedback equalizer of claim 1, wherein said feedback path controller comprises:
   a respective early-late detector for each different data pulse pattern configured to monitor values sampled with a recovered main clock nominally at a center of an eye of a data pulse, and with a quadrature clock nominally in a transition region of the data pulse to produce a positive value, a negative value or a null value depending on whether an early or a late sampling instant or none of the two is detected when the data pulse pattern occurs in the received bitstream;
   an accumulator coupled to said respective early-late detectors configured to receive early-late data detected for different data pulse patterns; and
   a controller coupled to said accumulator configured to receive accumulated early-late output values, and coupled to said controllable delay circuit for controlling the delay therein by generating an increment or a decrement command.

4. The decision feedback equalizer of claim 3, wherein said respective early-late detectors comprise first and second early-late detectors, said first early-late detector configured to invert a sign of the early-late data received for a first data pulse pattern and to sum with early-late data received by said second early-late detector for a different data pulse pattern, and to sum with a current output value of said accumulator for updating the accumulated early-late output value to be fed to said controller.

5. The decision feedback equalizer of claim 3, wherein each respective early-late detector records a number of respective data pulse patterns contributing to the resulting early-late data being provided to said accumulator.

6. The decision feedback equalizer of claim 5, wherein said accumulator comprises an unbalance checker configured to determine an unbalance among a plurality of contributory detections of the different bit patterns being monitored, and configured to momentarily halt accumulation of the early-late data of detected bit patterns for as long as fresh early-late data is gathered for a least detected bit pattern.

7. The decision feedback equalizer of claim 5, wherein said controller compares early-late sampling instant information received from said accumulator with at least a fixed or programmable positive threshold, and with at least a fixed or programmable negative threshold for generating an increment or a decrement command to said controllable delay circuit in the signal feedback path.

8. The decision feedback equalizer of claim 7, wherein said accumulator is resettable, and is reset by said controller based upon the generated increment or decrement command.

9. A receiver comprising:
   an input path configured to receive a bitstream with inter-symbol interference;
   a decision feedback equalizer coupled to said input and configured to reduce the inter-symbol interference in the received bitstream, and comprising
   a feedback signal path coupled to said input path for correcting a sampled value of an incoming bit of the bitstream based on inter-symbol interference of a preceding bit, said feedback signal path comprising a controllable delay circuit configured to receive the preceding bit; and
   a feedback path controller coupled to said controllable delay circuit to regulate a delay introduced to the preceding bit, the delay being a function of an accumulated value of data of early-late events of a sampling instant of the bitstream for a plurality of different data pulse patterns.

10. The receiver of claim 9, wherein said feedback signal path further comprises a multiplier having a first input coupled to an output of said controllable delay circuit, and a second input configured to receive an estimated correction coefficient of inter-symbol interference.

11. The receiver of claim 9, wherein said feedback path controller comprises:
    a respective early-late detector for each different data pulse pattern configured to monitor values sampled with a recovered main clock nominally at a center of an eye of a data pulse, and with a quadrature clock nominally in a transition region of the data pulse to produce a positive value, a negative value or a null value depending on whether an early or a late sampling instant or none of the two is detected when the data pulse pattern occurs in the received bitstream;
    an accumulator coupled to said respective early-late detectors to receive early-late data detected for different data pulse patterns; and
    a controller coupled to said accumulator to receive accumulated early-late output values, and coupled to said controllable delay circuit to control the delay therein by generating an increment or a decrement command.

12. The receiver of claim 11, wherein said respective early-late detectors comprise first and second early-late detectors, said first early-late detector configured to invert a sign of the early-late data received for a first data pulse pattern and to sum with early-late data received by said second early-late detector for a different data pulse pattern, and to sum with a current output value of said accumulator to update the accumulated early-late output value to be fed to said controller.

13. The receiver of claim 11, wherein each respective early-late detector records a number of respective data pulse patterns contributing to the resulting early-late data being provided to said accumulator.

14. The receiver of claim 13, wherein said accumulator comprises an unbalance checker configured to determine an unbalance among a plurality of contributory detections of the different bit patterns being monitored, and configured to momentarily halt accumulation of the early-late data of detected bit patterns for as long as fresh early-late data is gathered for a least detected bit pattern.

15. The receiver of claim 13, wherein said controller compares early-late sampling instant information received from said accumulator with at least a fixed or programmable positive threshold, and with at least a fixed or programmable negative threshold for generating an increment or a decrement command to said controllable delay circuit in the signal feedback path.

16. The receiver of claim 15, wherein said accumulator is resettable, and is reset by said controller based upon the generated increment or decrement command.

17. A method for reducing inter-symbol interference in a bitstream using a decision feedback equalizer, the decision feedback equalizer comprising an input path and a feedback signal path coupled to the input path, the method comprising:
receiving the bitstream with inter-symbol interference at the input path;
correcting a sampled value of an incoming bit of the bitstream based on inter-symbol interference of a preceding bit using the feedback signal path, the feedback signal path comprising a controllable delay circuit for receiving the preceding bit; and
regulating a delay introduced to the preceding bit by using a feedback path controller coupled to the controllable delay circuit, the delay being a function of an accumulated value of data of early-late events of a sampling instant of the bitstream for a plurality of different pre-established data pulse patterns.

18. The method of claim 17, wherein the feedback path controller comprises:
a respective early-late detector for each different data pulse pattern for monitoring values sampled with a recovered main clock nominally at a center of an eye of a data pulse, and with a quadrature clock nominally in a transition region of the data pulse to produce a positive value, a negative value or a null value depending on whether an early or a late sampling instant or none of the two is detected when the data pulse pattern occurs in the received bitstream;
an accumulator coupled to the respective early-late detectors for receiving early-late data detected for different data pulse patterns; and
a controller coupled to the accumulator for receiving accumulated early-late output values, and coupled to the controllable delay circuit for controlling the delay therein by generating an increment or a decrement command.

19. The method of claim 18, wherein the respective early-late detectors comprise first and second early-late detectors, the first early-late detector for inverting a sign of the early-late data received for a first data pulse pattern and to sum with early-late data received by the second early-late detector for a different data pulse pattern, and to sum with a current output value of the accumulator for updating the accumulated early-late output value to be fed to the controller.

20. The method of claim 19, wherein each respective early-late detector records a number of respective data pulse patterns contributing to the resulting early-late data being provided to the accumulator.

21. The method of claim 20, wherein the accumulator comprises an unbalance checker for determining an unbalance among a plurality of contributory detections of the different bit patterns being monitored, and for momentarily halting accumulation of the early-late data of detected bit patterns for as long as fresh early-late data is gathered for a least detected bit pattern.

22. The method of claim 20, wherein the controller compares early-late sampling instant information received from the accumulator with at least a fixed or programmable positive threshold, and with at least a fixed or programmable negative threshold for generating an increment or a decrement command to the controllable delay circuit in the signal feedback path.

23. The method of claim 22, wherein the accumulator is resettable, and is reset by the controller based upon the generated increment or decrement command.

24. A method of decision feedback equalization using a decision feedback equalizer for a receiver of a digital transmission system, the decision feedback equalizer comprising a feedback path for controlling signal propagation delay and/or bandwidth, the method comprising:
recovering a main clock and a quadrature clock from a received pulse data bitstream;
choosing at least two different data pulse patterns to be monitored in the received pulse data bitstream;
sampling the received pulse data bitstream with the main clock nominally at a center of an eye of a data pulse, and with the quadrature clock nominally in a transition region of the data pulse;
summing data associated with detections of early and late sampling instants for generating resulting early-late data for each bit pattern being monitored;
merging the resulting early-late data of the at least two different data pulse patterns with a current accumulated early-late value for generating an updated accumulated early-late value; and
providing the updated accumulated early-late value to the feedback path for controlling signal propagation delay and/or bandwidth for the decision feedback equalizer.

25. The method of claim 24, further comprising:
counting for each bit pattern being monitored a number of occurrences of each bit pattern contributing to the resulting early-late data; and
detecting an unbalance between a plurality of contributory detections of the different bit patterns exceeding a threshold, and momentarily halting summing accumulation of the early-late data of detected bit patterns other than a detected least occurring bit pattern until fresh early-late data is accumulated for a least occurring bit pattern to address the unbalance.

* * * * *